United States Patent [19]

Haruta et al.

[11] Patent Number: 4,839,327

[45] Date of Patent: Jun. 13, 1989

[54] METHOD FOR THE PRODUCTION OF ULTRA-FINE GOLD PARTICLES IMMOBILIZED ON A METAL OXIDE

[75] Inventors: Masatake Haruta, Kawanishi; Tetsuhiko Kobayashi, Ikeda, both of Japan

[73] Assignees: Agency of Industrial Science & Technology; Ministry of International Trade & Industry, both of Tokyo, Japan

[21] Appl. No.: 171,810

[22] Filed: Mar. 22, 1988

[30] Foreign Application Priority Data

Apr. 8, 1987 [JP] Japan .................................. 62-87472

[51] Int. Cl.$^4$ ...................... B01J 21/04; B01J 21/08; B01J 23/52
[52] U.S. Cl. ................................. 502/243; 502/317; 502/324; 502/330; 502/331; 502/344
[58] Field of Search ............... 502/243, 317, 330, 331, 502/344, 324

[56] References Cited

U.S. PATENT DOCUMENTS 4,698,324 10/1987 Haruta et al. ..................... 502/243

FOREIGN PATENT DOCUMENTS 1472062 4/1977 United Kingdom ................ 502/243

Primary Examiner—W. J. Shine
Attorney, Agent, or Firm—Oblon, Spivak, McClelland, Maier & Neustadt

[57] ABSTRACT

A composite having ultra-fine gold particles uniformly and strongly immobilized in a deposited state on a metal oxide is obtained by preparing a solution containing the metal oxide as a carrier and a gold compound, adjusting the pH value of the solution to a specific level thereby inducing precipitation and deposition of gold hydroxide or gold on the carrier and, when the precipitate is in the form of gold hydroxide, further, firing the precipitate. The ultra-fine gold particles immobilized on metal oxides are useful as a catalyst for reduction and oxidation, in sensor elements for flammable gases, and as an electrode catalyst.

16 Claims, 1 Drawing Sheet

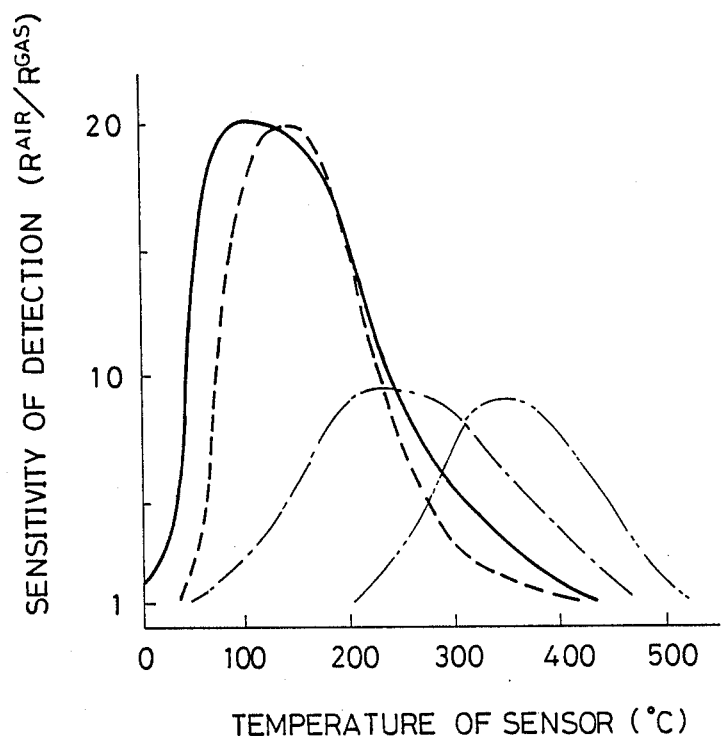

METHOD FOR THE PRODUCTION OF ULTRA-FINE GOLD PARTICLES IMMOBILIZED ON A METAL OXIDE

BACKGROUND OF THE INVENTION

1. Field of the Invention

This invention relates to ultra-fine gold particles immobilized with oxides, methods for the production thereof, and oxidation catalysts, reduction catalysts, flammable gas sensor elements, and electrode catalysts having the ultra-fine gold particles immobilized with oxides as substantially the main component thereof.

2. Prior Art Statement

It has been known that ultra-fine gold powder having a particle diameter of smaller than about 0.1 $\mu$m exhibits specific physical and chemical properties different from those of ordinary coarse gold powder ("Ultra-fine Powder", published by Agne Publishing Center, 1986).

Generally, any ultra-fine powder requires careful handling because it has large surface energy and great liability to coagulation. Particularly, an ultra-fine gold powder exhibits strong cohesiveness among the individual particles thereof and is liable to coagulate as compared with similar powders of other noble metals such as Pt and Pd.

In practical utilization, it is desirable to develop a method for immobilizing ultra-fine gold particles in a uniformly dispersed and deposited state on a carrier. For example, a method has been disclosed (Japanese Patent Public Disclosure SHO No. 60(1985)-238148) which produces a composite material having a gold compound dispersed in a metal oxide by the coprecipitation from a mixed aqueous solution containing water-soluble compounds of manganese, iron, cobalt, nickel, and copper and one of water soluble gold compounds. This method has a disadvantage in that it is incapable of immobilizing fine gold particles on a premolded catalyst carrier of a metal oxide or a molded support carrying thereon a metal oxide and it requires a great deal of gold.

There has also been disclosed another method which conducts deposition of ultra-fine gold particles on a carrier by immersing the carrier in an aqueous solution containing water soluble salts of gold and transition metals and urea and/or acetamide. (Japanese Patent Application No. SHO 60(1985)-192775: U.S. Pat. No. 4,698,324) This method has a disadvantage that it is incapable of accurately controlling the conditions for gold deposition and the deposition of gold in the aqueous solution requires as much as several hours' time. It has another disadvantage in that the gold component can be only partially deposited from the aqueous solution. This problem results in low efficiency in gold usage and therefore high production cost. The precipitates of gold obtained by this method tend to become heterogeneously dispersed and the control of the distribution of particle diameter is appreciably limited.

OBJECT AND SUMMARY OF THE INVENTION

In view of the difficulties suffered by the conventional methods as described above, the inventors have made a study in search of a method which, by a simple procedure, efficiently produces a composite material having ultra-fine gold particles uniformly and strongly immobilized on a carrier made of a metal oxide. They have continued a study based on their observation about the formation of precipitate, the reaction of dissolution, the absorption on the surface of a metal oxide, and other behaviors of complex gold ions in an aqueous alkaline solution. They have consequently found that ultra-fine particles of gold hydroxide or metallic gold can be uniformly deposited with high efficiency on the surface of a metal oxide when the pH value of an aqueous solution and the method of addition of a water-soluble salt of gold and other additives are adjusted to specific conditions and that uniform and strong immobilization of ultra-fine gold particles can be obtained on the metal oxide by heating the deposited gold hydroxide. They have also established that the ultra-fine gold particles immobilized on some metal oxides are very useful for oxidation catalysts, reduction catalysts, flammable gas sensor elements, and electrode catalysts, for example.

This invention is directed to:

A. Ultra-fine gold particles immobilized on metal oxides, i.e. a composite having a ultra-fine gold particles immobilized in a deposited form on a metal oxide and B. A method for the production of the ultra-fine gold particles immobilized on metal oxides mentioned above.

To be specific, this invention concerns:

A method for the production of ultra-fine gold particles immobilized on metal oxides, characterized by adding dropwise an aqueous gold compound solution with a pH value of 7 to 11 into a metal oxide-containing water kept at a pH value of 7 to 11 thereby obtaining an aqueous solution containing the metal oxide with gold hydroxide deposited thereon, separating the metal oxide having gold hydroxide deposited thereon from the aqueous solution, and heating the separated metal hydroxide at a temperature in the range of 100° to 800° C.

A method for the production of ultra-fine gold particles immobilized on metal oxides, characterized by adding a reducing agent for the deposition of metallic gold which is kept at a pH value of 7 to 11 into an aqueous metal oxide solution having a gold compound dissolved therein and kept at a pH value of 7 to 11 thereby obtaining an aqueous solution containing the metal oxide with gold immobilized thereon, and separating the metal oxide having gold immobilized thereon from the aqueous solution.

A method for the production of ultra-fine gold particles immobilized on metal oxides, characterized by adding one member selected from the group consisting of carbon dioxide gas and acidic aqueous solutions into an aqueous solution containing metal oxide and dissolving a gold compound therein and kept at a pH value of not less than 11 thereby adjusting the pH value of the aqueous solution in the range of 7 to 11 and obtaining an aqueous solution of the metal oxide having gold hydroxide deposited on the surface thereof, separating the metal oxide having gold hydroxide deposited thereon from the aqueous solution, and then heating the separated metal oxide at a temperature in the range of 100° to 800° C.

This invention further concerns catalysts and flammable gas sensor elements which have the aforementioned ultra-fine gold particles immobilized on metal oxides as substantially the main component thereof.

BRIEF DESCRIPTION OF THE DRAWING

The drawing shows the relation between the sensitivity of detection and the temperature of a sensor, obtained when a flammable gas sensor having as substantially the main component thereof ultra-fine gold particles immobilized on metal oxides of this invention produced as indicated in Example 11 was tried on various flammable gases.

DETAILED DESCRIPTION OF THE PREFERRED EMBODIMENT

Firstly, methods used for the production of a ultra-fine gold particles immobilized on metal oxides contemplated by the present invention will be described below.

(I) First method:

First, an aqueous solution containing a metal oxide to be used as a carrier is adjusted to a pH value in the range of 7 to 11, preferably 7.5 to 10. This aqueous solution is kept stirred and an aqueous gold compound solution is added to the stirred aqueous solution to effect deposition of gold hydroxide on the aforementioned metal oxide. Then the metal oxide having gold hydroxide deposited thereon is separated from the reaction solution and after washing heated to a temperature in the range of 100° to 800° C. to effect conversion of gold hydroxide into metallic gold. As the result, ultra-fine gold particles are immobilized on the surface of the metal oxide.

As concrete examples of the metal oxide usable in this method, there can be cited $MnO_2$, $Fe_2O_3$, $Co_3O_4$, $NiO$, $CuO$, $CuMnO_2$, Co-Mn complex oxide, $Al_2O_3$, $SiO_2$, $TiO_2$, $V_2O_5$, $MoO_3$, and $WO_3$. In the present invention, a metal oxide having an isoelectric point exceeding a level of about pH 6 proves to be particularly easy to use. The term "metal oxide" as used in the present invention should be construed as embracing the so-called precursors of metal oxides such as carbonates and hydroxides which are converted by heating into metal oxides.

This invention puts no restriction on the form of the metal oxide, which may be a powder or be molded. It is also permissible to use the metal oxide as deposited on a suitable carrier. Examples of the carrier are foams, honeycombs, and pellets formed of ceramics of alumina, silica, titania, and magnesia and various metals.

The amount of the metal oxide to be added to water is not specifically limited. When the metal oxide is used in the form of powder, for example, the amount may be such that the metal oxide will be uniformly dispersed in the water. Generally, the amount suitably falls approximately in the range of 10 to 200 g/liter. When the metal oxide is used as molded in a prescribed form, the amount to be added to water has only to be such that the aqueous solution will be allowed to contact amply the surface of the molded metal oxide.

The gold compounds are used in the form of water-soluble salts. Examples of the water-soluble gold salts include chloroauric acid ($HAuCl_4$), sodium chloroaurate ($NaAuCl_4$), gold cyanide ($AuCN$), potassium cyanoaurate $\{K[Au(CN)_2]\}$, and trichlorodiethylamine auric acid $[(C_2H_5)_2NH.AuCl_3]$. Though the concentration of the aqueous gold compound solution to be used for dropwise addition is not specifically limited, it is generally fixed desirably in the range of 0.1 to 0.001 mol/lit.

The adjustment of the pH value of the metal oxide in a prescribed range may be generally effected by the use of an alkali compound such as, for example, sodium carbonate, sodium hydroxide, potassium carbonate, and ammonia.

The aqueous gold compound solution must be gradually added dropwise under stirring lest the addition thereof should induce a rapid reaction and consequently give rise to large gold hydroxide precipitates in the solution phase. Generally, the speed of the dropwise addition may be suitably adjusted proportionally to the amount of the aqueous solution for addition, with the period of dropwise addition fixed approximately in the range of 3 to 60 minutes, so as to preclude precipitation of large hydroxide precipitates in the solution.

Suitably, the temperature of the dispersion being produced during the dropwise addition of the aqueous solution is approximately in the range of 20° to 80° C.

The amount of the gold compound to be added dropwise is governed by the amount of the ultra-fine gold particles desired to be carried on the metal oxide. The upper limit of this amount is variable with the kind, form, specific surface area, etc. of the metal oxide to be used. Generally this amount falls approximately in the range of 0.1 to 10% by weight.

In the first method described above, since the gold compound is gradually added dropwise, the hydroxide of gold which is formed in a liquid phase during the course of the dropwise addition is immediately redissolved and the redissolved gold compound is adsorbed on the surface of the metal oxide, with the result that the gold is deposited in the form of hydroxide on the aforementioned surface with the metal oxide as the nucleus. Thus, the gold compound added dropwise will never be precipitated in the aqueous solution.

In the aqueous solution to which the gold compound has been added dropwise, the gold is generally present in the form of negatively charged complex ions. For the purpose of enhancing the efficiency of the deposition of gold on the metal oxide, therefore, the pH value of the dispersion is desired to be adjusted on the acidic side, specifically to a level lower than the point of zero charge of the metal oxide, so that the surface of the metal oxide will assume a positive charge. When the pH value has to be adjusted on the alkali side relative to the point of zero charge, it is adequate to adjust the pH value as close to the point of zero charge as possible. Preferably, the pH value should be about 0.5 higher than the pH value of the point of zero charge.

The gold compound is easily deposited in the form of hydroxide on the metal oxide generally when the pH value thereof falls approximately in the range of 7 to 11. During the course of deposition, this gold compound tends to liberate acidic ion and lower the pH value of the solution. When $HAuCl_4$ is used as a gold compound, for example, the gold compound liberates $Cl^-$ ion and lowers the pH value of the solution. To ensure uniform precipitation of ultra-fine gold particles, it is desirable to inhibit by the dropwise addition of an aqueous alkali solution the variation of the pH value of the solution, which might otherwise occur. Particularly when the solution to be used has a low pH value in the range of 7 to 8, it is desirable for the aqueous gold compound solution and the aqueous alkali solution to be added dropwise simultaneously lest the pH value of the reaction solution should fall below 7.

The metal oxide having the hydroxide of gold deposited thereon is separated from the reaction solution and after washing then heated to a temperature in the range of 100° to 800° C. As a result, the hydroxide of gold is decomposed and the resultant gold is uniformly and strongly immobilized in the form of ultra-fine gold particles on the metal oxide. Suitably, the heating time is generally selected in the range of 1 to 24 hours.

(II) Second method:

To an aqueous metal oxide solution having a gold compound dissolved therein and kept at a pH value in the range of 7 to 11, preferably 7.5 to 10, an aqueous solution of a reducing agent is added dropwise under stirring to effect reductive precipitation of gold on the surface of the metal oxide and consequently immobilization of ultra-fine gold particles.

The gold compounds, the metal oxides, and the alkaline compounds for pH adjustment to be used in this method are similar to those used in the first method. The amount of the metal oxide to be added may be similar to that in the first method. For the purpose of this second method, it is proper to use the gold compound in a concentration falling in the range of $1 \times 10^{-2}$ to $1 \times 10^{-5}$ mol/lit. The temperature of the aqueous solution containing metal oxide is suitably in the range of 0° to 80° C.

Examples of the reducing agents which are usable advantageously in this method include hydrazine, formalin, and sodium citrate. These reducing agents may be advantageously used in a concentration approximately in the range of $1 \times 10^{-1}$ to $1 \times 10^{-3}$ mol/lit. The amount of the aqueous solution of the reducing agent is suitably 1.5 to 10 times the amount required stoichiometrically. The aqueous solution of the reducing agent must be gradually added dropwise lest it should induce rapid precipitation of gold in the solution. Properly the time for the dropwise addition generally falls in the range of 3 to 60 minutes approximately.

Owing to the dropwise addition of the aqueous solution of the reducing agent, the gold compound assorbed on the surface of the metal oxide is reduced and deposited strongly on the metal oxide.

When $Fe_2O_3$ is used as a metal oxide, the gold compound is deposited with efficiency on the metal oxide even where the pH value is as high as 11. In the case of other metal oxide, it often happens that the surface of the metal oxide is strongly charged negatively and the deposition of the gold compound occurs with poor efficiency where the pH value is as high as mentioned above. Where there is used a metal oxide of this nature, it is desirable to adjust the pH value of the aqueous solution approximately in the range of 7 to 8 so that the metal oxide may be positively charged or, when it is charged negatively, the magnitude of the negative charge may be diminished. Where the metal oxide is immersed in a solution with a pH value of 7 to 8, it is desirable to maintain the speed of reductive precipitation of gold nearly constant by carrying out dropwise addition of the aqueous alkali solution simultaneously with the dropwise addition of the reducing agent so as to prevent the pH value of the aqueous solution from falling.

Where the ultra-fine gold particles immobilized on metal oxides produced as described above is to be used at elevated temperatures, it is desirable to ensure stability thereof at the elevated temperatures by once heating the composite to a temperature near the prospective working temperature in advance of actual use.

(III) Third method:

In an aqueous solution containing metal oxide and a gold compound dissolved therein which is kept at a pH value of not less than 11 and not more than 12, deposition of gold hydroxide on the surface of the metal oxide is effected by bubbling carbon dioxide gas into the aqueous solution or gradually adding an acidic aqueous solution dropwise under stirring to the aqueous solution thereby lowering the pH value of the aqueous solution to a level in the range of 7 to 11. The metal oxide having gold hydroxide deposited thereon is separated from the reaction solution and after washing heated to a temperature in the range of 100° to 800° C. to bring about immobilization of ultra-fine gold particles on the surface of the metal oxide.

The kinds and amounts of the gold compound, the metal oxides, and the alkaline compounds may be the same which have been mentioned above with respect to the first method. Suitably, the temperature of the aqueous metal oxide solution is selected approximately in the range of 20° to 80° C.

For this method, it is necessary that the gold compound should be present in the aqueous metal oxide solution as dissolved therein in the form of a complex ion having a hydroxyl group excessively bonded thereto. The pH value of the aqueous metal oxide solution is adjusted, depending on the particular kind of the gold compound actually in use, on a more alkali side than pH 11 so that the gold compound may assume a state dissolved therein in the form of a hydroxyl group-containing complex ions.

In the aqueous solution adjusted in the state mentioned above, the gold is precipitated in the form of hydroxide and deposited on the metal oxide as the nucleus by bubbling carbon dioxide gas into the aqueous solution or gradually adding an acidic aqueous solution dropwise to the aqueous solution thereby gradually lowering the pH value of the solution to a level in the range of 7 to 11.

The speed at which the carbon dioxide gas is bubbling in the aqueous solution is not particularly limited. It suffices to adjust this speed so as to keep the aqueous solution evenly bubbling.

As the acidic aqueous solution, the aqueous solution of nitric acid, hydrochloric acid, sulfuric acid, or acetic acid, for example, can be used. The concentration of the acidic aqueous solution may be suitably selected approximately in the range of $1 \times 10^{-1}$ to $1 \times 10^{-3}$ mol/lit. The total amount of the acidic aqueous solution to be added dropwise is only required to be such that the pH value of the aqueous metal oxide solution will not fall below 7. The speed of the dropwise addition may be suitably fixed, commensurately with the amount of the acidic aqueous solution to be added dropwise over a period which falls in the range of 3 to 60 minutes, so as to preclude the otherwise possible occurrence of large gold hydroxide precipitates.

When the metal oxide having the hydroxide of gold deposited thereon is heated to a temperature in the range of 100° to 800° C., the hydroxide of gold deposited thereon is decomposed to form ultra-fine gold particles and to bring about uniform and strong immobilization of the particles on the metal oxide. Suitably, the heating time may be selected approximately in the range of 1 to 24 hours.

In any of the methods described above, for the purpose of ensuring thorough deposition of the gold compound upon the metal oxide, the aqueous metal oxide solution is desired to be stirred for a period approximately in the range of 30 minutes to two hours after completion of the dropwise addition or the blowing.

By any of the methods of this invention described above, ultra-fine gold particles having a uniform particle diameter not exceeding a level of about 500 Å can be immobilized on a metal oxide and particularly ultra-fine gold particles having a particle diameter below a level of about 250 Å, the diameter never attained by the conventional method, can be uniformly and strongly deposited on the metal oxide. By any of the aforementioned first to third methods, the ultra-fine gold particles can be deposited on the metal oxide in an amount roughly in the range of 0.1 to 10% by weight, based on the amount of the metal oxide.

In any of the aforementioned methods, the metal oxide may be used in a premolded state or in a state carried in advance on any of various spport besides being used in a powdered state. The ultra-fine gold particles may be immobilized, for example, directly on a sintered piece with a platinum wire embedded or on a sintered piece of a metal oxide to be used as an electrode connected to an electric lead.

The ultra-fine gold particles immobilized on metal oxides which are obtained by the present invention are composites having ultra-fine gold particles uniformly carried on any of various metal oxides and can be used for various purposes.

The ultra-fine gold particles immobilized on metal oxides of the present invention, for example, can catalyze the combustion of such fuels as hydrogen, carbon monoxide, methanol, and propane in a wide range of concentrations at relative low temperatures not exceeding 300° C. Thus, it is useful as a catalyst for various space heaters and cooking heaters of the catalyst combustion type. It can be used also as a waste gas-cleaning catalyst for oil stoves, oil fan heaters, and gas fan heaters and as an air-cleaning catalyst filter for air-conditioning devices. It can also be used as a catalyst for oxidizing spent solvents as in the coating industry or as a catalyst for cleaning waste gases emitted from plants.

It is also useful as a catalyst in the reduction of such nitrogen oxides as NO and $NO_2$ with hydrogen or carbon monoxide, for example.

Besides the applications mentioned above, it is useful as a sensor element for the detection of such flammable gases as hydrogen, carbon monoxide, methanol, and hydrocarbons.

It is further useful as an electrode catalyst for fuel cells using hydrogen, carbon monoxide, methanol, and hydrocarbons and for electrochemical reactions of such gases as mentioned above.

Where the ultra-fine gold particles immobilized on metal oxides are used as an oxidation catalyst, reduction catalyst, gas sensor element, or electrode catalyst, the metal oxide serving as the carrier therefor is not particularly limited to a certain kind. Generally, it is particularly desirable to use one member selected from the group consisting of $MnO_2$, $Fe_2O_3$, $Co_3O_4$, NiO, CuO, $CuMnO_2$, and Co-Mn complex oxide.

Since the present invention enables the ultra-fine gold particles to be immobilized in a deposited state on various metal oxides in a short period of time and ensures high efficiency of gold deposition, it enables a saving in the amount of the gold compound used in the production of the ultra-fine gold particles immobilized on metal oxides.

Since the method of this invention is capable of directly immobilizing ultra-fine gold particles on a metal oxide which is carried in advance on a premolded sintered piece or on a support, it can be conveniently used for making gas sensor elements and electrodes by effecting the direct immobilization of the ultra-fine gold particles on such materials as mentioned above.

Now, the present invention will be described in detail below.

EXAMPLE 1

In 500 ml of water, 5.0 g of iron oxide (III) ($\alpha$-$Fe_2O_3$) powder was suspended. The produced suspension was stirred and an aqueous chloroauric acid ($HAuCl_4$) solution and an aqueous sodium carbonate ($NaCO_3$) solution were simultaneously added dropwise thereto over a period of 10 minutes. In this case, the concentration of the aqueous chloroauric acid solution was $2.5 \times 10^{-3}$M and the amount of the aqueous solution added dropwise was 100 ml. The concentration of the aqueous sodium carbonate solution was 0.1M and the amount thereof was such as to adjust the pH value of the suspension in the range of 8 to 9. The stirring of the suspension was continued for one hour after finishing the dropwise addition of the aqueous solutions to complete deposition of gold hydroxide (III) ($Au(OH)_3$) on the surface of iron oxide. When the colorless transparent supernatant of the suspension was adjusted to pH 12 by addition of sodium hydroxide and then reduced with formalin as a reagent, it produced absolutely no change of color due to precipitation of gold, indicating that the gold in the solution was almost perfectly deposited.

The iron oxide having gold hydroxide deposited thereon was removed from the reaction solution, washed with water, dried, and then fired in air at 400° C. for three hours to effect thermal decomposition of the gold hydroxide. Consequently, there was obtained a composite Au (1 wt %)$\alpha Fe_2O_3$, having gold deposited on the surface of iron oxide as contemplated by this invention applicable particularly for a catalyst (hereinafter referred to as "catalyst"). By X-ray photoelectron spectrometric measurements and X-ray diffraction measurements, the gold deposited on the surface of the catalyst was found to be in a metallic state and to possess a particle diameter of not more than 100 Å.

Through a 0.2 g sample of the 40–70 mesh fraction of the aforementioned catalyst, a mixed gas of air containing 1% by volume of carbon monoxide (CO) was passed at a flow rate of 67 ml/min to measure the activity of the catalyst in the oxidation of carbon monoxide.

As a result, 95% of the carbon monoxide was oxidized at 0° C. Thus the test showed this catalyst, Au/$\alpha$-$Fe_2O_3$, to be highly effective in oxidizing carbon monoxide even at around 0° C.

EXAMPLE 2

In 18 ml of an aqueous 0.7M nickel nitrate (II) (Ni($NO_3$)$_2$) solution, 10 g of a 20–40 mesh fraction of alumina ($\gamma$-$Al_2O_3$) powder was immersed. The resultant product was vacuum dried to obtain granules. The resultant granules were fired in air at 400° C. for three hours to effect thermal decomposition of nickel nitrate and obtain a NiO/$\gamma$-$Al_2O_3$ composite, i.e. a composite consisting of alumina having its surface coated with nickel oxide (II) (NiO). In 500 ml of water, 5.0 g of the NiO/$\gamma$-$Al_2O_3$ granules were suspended.

The resultant suspension was kept stirred and an aqueous chloroauric acid ($HAuCl_4$) solution and an aqueous sodium carbonate ($Na_2CO_3$) solution were simultaneously added dropwise to the suspension over a period of 30 minutes. In this case, the concentration of the aqueous chloroauric acid solution was $2.5 \times 10^{-3}$M and the amount of the aqueous solution added dropwise was 100 ml. The concentration of the aqueous sodium carbonate solution was 0.1M and the amount thereof was such as to keep the pH value of the suspension in the range of 7 to 8. The stirring of the suspension was continued for one hour after finishing the dropwise addition to complete precipitation and deposition of gold hydroxide (III) (Au(OH)$_3$) on the surface of NiO/$\gamma$-Al$_2$O$_3$. When the colorless transparent supernatant of the suspension was adjusted to pH 12 by addition of potassium hydroxide and then reduced with formalin as a reagent, it produced absolutely no change of color due to precipitation of gold, indicating that the gold in the solution was almost completely deposited.

The NiO/$\gamma$-Al$_2$O$_3$ composite was separated from the reaction solution, washed with water, then dried, and further fired in air at 400° C. for three hours to effect thermal decomposition of the gold hydroxide and produce a Au (1 wt %)/NiO[$\gamma$-Al$_2$O$_3$] composite, consisting of gold deposited on the surface of NiO/$\gamma$-Al$_2$O$_3$ as contemplated by this invention applicable particularly for a catalyst (hereinafter referred to as "catalyst").

By X-ray photoelectron spectrometric measurements and X-ray diffraction measurements, the gold deposited on the surface of the catalyst was found to be in a metallic state and to possess a particle diameter equal to or less than 100 Å.

Through 0.2 g of the aforementioned catalyst, a mixed gas of air containing 1% by volume of carbon monoxide (CO) was passed at a rate of 67 ml/min to measure the activity of the catalyst in the oxidation of carbon monoxide. The conversion of carbon monoxide was 87% at 20° C. Thus, the test showed this catalyst, Au (1 wt %)/NiO[$\gamma$-Al$_2$O$_3$], to be highly effective in oxidizing carbon monoxide at room temperature.

EXAMPLE 3

In 100 ml of an aqueous ammonia solution of pH 7 having 0.21 g of chloroauric acid (HAuCl$_4$.4H$_2$O) dissolved therein, 2.0 g of manganese oxide (IV) powder was suspended. The suspension was kept stirred vigorously at room temperature and 3.5 ml of an aqueous 3.7 wt % hydrazine hydrochloride solution was introduced from a dropping funnel and an aqueous 10 wt % ammonia solution were simultaneously added piecemeal over a period of 30 to 60 minutes. The addition of the aqueous ammonia solution was continued until the final pH value of the aqueous solution reached 8. In the initial stage of the reaction before the addition of hydrazine hydrochloride, the aqueous solution was in a yellow transparent stage due to the presence of chloroauric acid. After the completion of reduction reaction, the supernatant of the reaction solution was in a colorless transparent state, not a red or blue transparent state, indicating the absence of colloidal gold in the liquid phase. The test showed that gold had been reductively deposited only on the surface of manganese oxide (IV).

The suspension obtained at the end of the reduction reaction was filtered. The residue of filtration was washed. The solid consequently obtained was vacuum dried overnight and fired in air at 300° C. for five hours. There was obtained a composite of this invention, i.e. manganese oxide (IV) having 5% by weight of gold immobilized in a deposited state thereon. Through 0.2 g of the manganese oxide having gold immobilized thereon, a mixed gas of air containing 1% by volume of methanol was passed at a rate of 67 mg/min to measure the activity of the composite in the oxidation of methanol. As a result, 76% of methanol was oxidized to carbon dioxide at 100° C.

EXAMPLE 4

In 200 ml of an aqueous 0.5M iron nitrate (III) solution, 100 g of alumina pellets roughly 3 mm in diameter were left immersed for three hours. The water component of the resultant mixture was evaporated to dryness with a rotary vacuum still. In a tubular container, the resultant pellets were fired in a current of air at 400° C. for five hours. Consequently, there were obtained alumina pellets having iron oxide (III) carried thereon. The pellets were immersed in 300 ml of an aqueous pH 10 potassium carbonate solution having 1.1 g of potassium chloroaurate, K[AuCl$_4$].2H$_2$O, dissolved therein. The aqueous solution was constantly stirred and circulated with a circulation pump to ensure retention of uniform temperature distribution in the liquid phase. To this aqueous solution, 20 ml of an aqueous 3.7 wt % formalin solution was gradually added dropwise over a period of 50 minutes. In this case similarly to Example 3, the supernatant obtained at the end of the reduction reaction was in a colorless transparent state, clearly indicating that the gold was reductively deposited only on the surface of iron oxide (III) carried on the alumina pellets.

The alumina pellets carrying thereon the iron oxide having gold deposited thereon were separated by filtration from the aqueous solution, washed several times, and then dried at 120° C. The dry alumina pellets were further fired at 400° C., to produce iron oxide type pellets having 0.5% by weight of gold immobilized in a deposited state thereon as contemplated by this invention applicable particularly for a catalyst (hereinafter referred to as "catalyst").

Through 0.2 g of the catalyst, argon gas containing 500 ppm of carbon monoxide, 500 ppm of nitrogen monoxide, and 500 ppm of oxygen was passed at a rate of 67 ml/min to measure the activity of the catalyst in selective reduction of nitrogen monoxide. As a result, 98% of the nitrogen monoxide was reduced 98% to nitrogen at 50° C., indicating that this catalyst, Au (0.5 wt %)/Fe$_2$O$_3$[Al$_2$O$_3$], was highly active in the reduction of nitrogen monoxide at low temperatures.

EXAMPLE 5

In 1,000 ml of a mixed aqueous solution containing 11.2 g of cobalt acetate (II) tetrahydrate and 42.8 g of urea, 10 g of alumina fibers were immersed. The resultant mixture was placed in a hermetically sealable vial and left standing in a constant temperature bath at 80° C. for five hours. Consequently, deposition of precipitated cobalt hydroxide occurred selectively on the alumina fibers. The coated alumina fibers were removed from the aqueous solution, washed with water, then immersed in 50 ml of an aqueous pH 10 sodium carbonate solution having 0.30 g of sodium cyanoaurate (I) dissolved therein and stirred therein with a vibration type stirrer and, 50 ml of an aqueous solution of 2.0 g of trisodium citrate dihydrate was gradually added dropwise thereto over a period of about 30 minutes.

In this case, similarly to Example 3, the supernatant obtained at the end of the reduction reaction was in a colorless transparent state, clearly indicating that deposition of precipitated gold occurred selectively on the surface of the cobalt hydroxide carried on the alumina fibers.

The coated alumina fibers were removed from the aqueous solution, vacuum dried for 10 hours, and then fired in air at 400° C. for five hours, to produce alumina fibers carrying thereon ultra-fine gold particles immobilized on cobalt oxide as contemplated by the present invention applicable particularly for a catalyst.

EXAMPLE 6

Cobalt ferrite ($CoFe_2O_3$) powder finely ground in a wet mill and a small amount of polyvinyl alcohol added thereto were kneaded to produce a paste. The paste was applied on a cordierite honeycomb measuring 5 cm×5 cm×2 cm and fired in air at 400° C. for three hours. The coated honeycomb was immersed in 200 ml of an aqueous pH 8.5 sodium carbonate solution, the aqueous solution was kept stirred and circulated with a circulation pump, and 50 ml of an aqueous solution of 0.30 g of sodium chloroaurate dihydrate, [$Na(AuCl_4.2H_2O)$], and 50 ml of an aqueous pH 9 sodium carbonate were gradually added dropwise over a period of 30 minutes.

In this case, similarly to Example 1, the supernatant was in a colorless transparent state. When it was adjusted to pH 12 by addition of potassium hydroxide and reduced by the addition of excess formalin, it produced absolutely no change of color due to precipitation of gold, clearly indicating that deposition of precipitated gold occurred only on the surface of the cobalt ferrite carried on the honeycomb. The honeycomb having gold deposited thereon by reduction was removed from the aqueous solution, washed, dried at 120° C. for 12 hours, and then fired in air at 500° C. for three hours, to produce a honeycomb carrying thereon ultra-fine gold particles immobilized on cobalt ferrite as contemplated by the present invention applicable particularly for a catalyst (hereinafter referred to as "catalyst").

Through this catalyst, air containing 1% by volume of hydrogen, carbon monoxide, or butane was passed at a flow rate of 500 liters/hours to measure the temperature for starting oxidation of the gas. The results were as shown in Table 1. In the test, it was found that the oxidation of hydrogen occurred below 100° C., that of carbon monoxide below 40° C., and that of butane below 250° C., clearly indicating that this catalyst was highly effective in catalyzing the oxidation.

TABLE 1

| Fuel | Temperature for starting oxidation |
|---|---|
| Hydrogen | 52° C. |
| Carbon monoxide | 23° C. (room temperature) |
| Butane | 190° C. |

EXAMPLE 7

A piece of nickel foam (having a porosity of 92%) 5 cm×10 cm×1 cm in size having lead wires connected thereto was subjected alternately to positive and negative polarization and finally polarized positively for about two hours in an aqueous sodium hydroxide solution, to form a nickel hydroxide coating on the surface of the foam. This foam was immersed in 200 ml of an aqueous pH 7.5 potassium carbonate solution, the aqueous solution was kept stirred and circulated with a circulation pump and, at the same time, 50 ml of an aqueous solution of 0.30 g of potassium cyanoaurate, {$K[Au(CN)_2]$}, and 50 ml of an aqueous pH 9 potassium carbonate solution were gradually added dropwise over 30 minutes.

In this case similarly to Example 1, the supernatant obtained at the end of the reduction reaction was in a colorless transparent state. When it was adjusted to pH 12 by addition of potassium hydroxide and then tested by addition of excess formalin, it produced absolutely no change of color due to precipitation of gold, clearly indicating that deposition of precipitated gold by reduction occurred only on the surface of nickel hydroxide carried on the foam.

The metallic foam having gold deposited thereby by reduction was removed from the aqueous solution, washed, then dried at 120° C. for 12 hours, and fired in the air at 250° C. for ten hours, to produce a foam electrode coated with ultra-fine gold particles immobilized on nickel oxide according to the present invention.

When electrolytic oxidation of CO was tried in an aqueous 1M sodium hydroxide solution using the foam electrode as a positive pole, an electric current originating in the oxidation of CO began to flow at 0.15 V, based on a hydrogen electrode. In the case of a nickel foam having platinum or copper deposited thereon, a higher voltage of 0.5 V or 0.4 V was required for starting the oxidation of CO. The results indicate that the nickel foam electrode carrying thereon ultra-fine gold particles immobilized on nickel oxide could be used as a highly desirable electrode catalyst for CO oxidation in the field of fuel cells.

EXAMPLE 8

The catalysts obtained in Examples 3, 4, and 5 were tested for activity in catalytic combustion of carbon monoxide. The gold/manganese oxide (IV) catalyst was pulverized and sieved to collect a 1.5 g 120–200 mesh fraction as a sample. From the other catalysts, 1.5 g samples were taken respectively in an unmodified form. Through a given sample catalyst, air containing 1% by volume of carbon monoxide was passed at a rate of 500 ml/min to determine the conversion by oxidation at room temperature (23° C.). The results were as shown in Table 2. It is noted from the results that with any of the catalysts tested, oxidation of 100% of CO occurred at temperatures not exceeding 100° C. These catalysts excelled in stability and showed no appreciable degradation of activity over a period of several days, while a hopcalite catalyst widely used so far was inactivated within two hours. When the test was conducted with a reaction gas which had been bubbled through water at 30° C., the catalysts showed no sign of decline of activity. Unexpectedly, in most cases the activity was improved in the presence of moisture.

TABLE 2

| Procedure of preparation of catalyst | Kind of catalyst | Conversion by oxidation (%) |
|---|---|---|
| Example 3 | $Au/MnO_2$ | 78 |
| Example 4 | $Au/Fe_2O_3$ (pellets of $\gamma$-$Al_2O_3$) | 95 |
| Example 4 | $Au/Fe_2O_3$ (pellets of $\gamma$-$Al_2O_3$) | 100* |
| Example 5 | $Au/Co_3O_4$ (Fibers of $Al_2O_3$) | 95 |

*In this test run, the reaction gas had been bubbled through water at 30° C. before reaching the test reactor.

EXAMPLE 9

In 500 ml of an alkaline aqueous solution of pH 12 containing $5.0 \times 10^{-4}$ mol of chloroauric acid ($HAuCl_4$) and $1.0 \times 10^{-2}$ mol of potassium hydroxide (KOH), 5.0 g of copper (II) oxide (CuO) powder was suspended. Carbon dioxide ($CO_2$) was bubbled into the suspension at a flow rate of 300 ml/min for three hours to induce deposition of gold hydroxide (III), ($Au(OH)_3$), on the surface of copper oxide. The coated copper oxide was washed with water, then dried, and further fired in air at 400° C. for three hours for thermal decomposition of the gold hydroxide, to obtain a composite, Au (2 wt %)/CuO, having gold carried on the surface of copper oxide as contemplated by the present invention particularly applicable for a catalyst (hereinafter referred to as "catalyst"). By X-ray photoelectron spectrometric measurements and X-ray diffraction measurements, the gold carried on the surface of the catalyst was found to be in a metallic state and to possess a particle diameter in the range of 100 to 200 Å.

Through 0.2 g of a 40–70 mesh fraction of the catalyst, a mixed gas of air containing 1% by volume of carbon monoxide (CO) was passed at a rate of 67 ml/min to measure the catalyst's activity in the oxidation of carbon monoxide. The catalyst showed a conversion of 91% of carbon monoxide by oxidation at 25° C., clearing indicating that this catalyst, Au/CuO, was highly active in the oxidation of carbon monoxide in the neighborhood of normal room temperature.

EXAMPLE 10

In 15 ml of a mixed aqueous solution consisting of 10 ml of an aqueous 0.4M cobalt nitrate (II), [Co(NO$_3$)$_2$], solution and 5 ml of an aqueous 0.4M manganese nitrate (II), [Mn(NO$_3$)$_2$], solution, 10 g of 20–40 mesh granular alumina ($\gamma$-Al$_2$O$_3$) was immersed. The resultant mixture was then vacuum dried. The powder consequently obtained was fired in air at 300° C. for three hours for thermal decomposition of cobalt nitrate and manganese nitrate, to produce a coating of cobalt-manganese complex oxide (Co$_2$MnO$_x$) on the surface of alumina. Consequently, there was obtained a composite, Co$_2$MnO$_x$/$\gamma$-Al$_2$O$_3$). In 500 ml of an alkaline aqueous solution of pH 11.5 containing $1.25 \times 10^{-4}$ mol of chloroauric acid (HAuCl$_4$) and $1.0 \times 10^{-2}$ mol. of potassium hydroxide (KOH), 5.0 g of the Co$_2$MnO$_x$/$\gamma$-Al$_2$O$_3$ powder was suspended. To this suspension, 0.1M nitric acid was added dropwise at a rate of 2 ml/min. to lower the pH value of the solution to 8 and bring about deposition of gold hydroxide (III), [Au(OH)$_3$], on the surface of Co$_2$MnO$_x$/$\gamma$-Al$_2$O$_3$. This composite was washed with water, then dried, and further fired in air at 400° C. for three hours for thermal decomposition of gold hydroxide, to produce a composite, Au (0.5 wt %)/Co$_2$MnO$_x$/$\gamma$-Al$_2$O$_3$, having gold carried on the surface of Co$_2$MnO$_x$/$\gamma$-Al$_2$O$_3$ as contemplated by the present invention applicable particularly for a catalyst (hereinafter referred to as "catalyst").

Through 0.2 g of the catalyst, a mixed gas of air containing 1% by volume of carbon monoxide (CO) was passed at a rate of 67 ml/min., to measure the catalytic activity in the oxidation of carbon monoxide. The catalyst showed a convertion of 93% of CO at 10° C., clearly indicating that this catalyst, Au/Co$_2$MnO$_x$/$\gamma$-Al$_2$O$_3$, exhibits high activity in the oxidation of carbon monoxide at around room temperature.

EXAMPLE 11

A detection material composed substantially of ultrafine gold particles immobilized on metal oxide of this invention and intended for use in a flammable gas sensor was prepared by the following procedure. In 300 ml of water, $3.0 \times 10^{-3}$ mol of titanium tetrachloride (TiCl$_4$), 6.0 ml of an aqueous 30% hydrogen peroxide solution, and $9.7 \times 10^{-2}$ mol of iron nitrate (III) (Fe(NO$_3$)$_3$) were dissolved. This mixed aqueous solution was added to 200 ml of an aqueous solution of $1.8'10^{-1}$ mol of sodium carbonate (Na$_2$CO$_3$) under stirring. The stirring was continued for one hour after completion of the addition, to obtain a coprecipitate of iron hydroxide (III) and titanium hydroxide (IV).

The coprecipitate was washed with water, dried, and then fired in air at 400° C. for three hours for thermal decomposition, to obtain a complex oxide, ($\alpha$-Fe$_2$O$_3$-TiO$_2$), of iron oxide (III) and titanium oxide (IV) in a powdery state.

This composite, $\alpha$-Fe$_2$O$_3$-TiO$_2$, was screen printed to produce a sintered thick film. Two electrodes were connected to this sintered thick film to permit measurement of electric resistance. To be more specific, two electrode-grade gold wires (0.05 mm in diameter) were placed parallel to each other as separated by 1.0 mm on the surface of an alumina base plate (0.5 mm in thickness) 10 mm $\times$ 10 mm in area and a mixture of 5 mg of $\gamma$-Fe$_2$O$_3$-TiO$_2$ with about 0.01 ml of water was applied thereon. The product was dried at 120° C. for 12 hours and then fired in air at 400° C. for one hour, to give rise to a sintered thick film fitted with electrodes. It was used as a basic element for a flammable gas sensor.

This gas sensor was immersed in 25 ml of water and an aqueous solution of chloroauric acid (HAuCl$_4$) and an aqueous solution of sodium carbonate (Na$_2$CO$_3$) were simultaneously added dropwise over a period of 5 minutes to the water containing the gas sensor element under stirring. In this case, the concentration of the aqueous chloroauric acid solution was $2.5 \times 10^{-4}$M and the amount thereof added dropwise was 10 ml. The concentration of the aqueous sodium carbonate solution was 0.1M and this solution was added in an amount sufficient to adjust the pH value of the suspension in the range of 8 to 9. The stirring of the suspension was continued for one hour after completion of the dropwise addition, to induce deposition of gold hydroxide (III) [Au(OH)$_3$] on the surface of $\alpha$-Fe$_2$O$_3$-TiO$_2$. The colorless transparent supernatant of the reaction solution was adjusted to pH 12 by adding sodium hydroxide and was reduced by addition of formalin. In this test, the supernatant showed absolutely no change of color due to precipitation of gold, clearly indicating that the gold in the solution was almost perfectly deposited.

The composite consisting of $\alpha$-Fe$_2$O$_3$-TiO$_2$ having gold hydroxide deposited thereon was washed with water, dried, and further fired in air at 400° C. for three hours for thermal decomposition of gold hydroxide, to produce a sensor element, Au (10 wt %) $\alpha$-Fe$_2$O$_3$-TiO$_2$, consisting of gold carried on $\alpha$-Fe$_2$O$_3$-TiO$_2$.

By X-ray photoelectron spectrometric measurements and X-ray diffraction measurements, the gold carried on the surface of the sensor material was found to be in a metallic state and to possess a particle diameter smaller than 100 Å.

The sensitivity of flammable gas detection was shown by the ratio of the magnitude of electric resistance ($R_{air}$) exhibited by the gas sensor element in air to the magnitude of electric resistance ($R_{gas}$) exhibited in the gas under test.

Air containing 500 ppm of hydrogen, isobutane, or carbon monoxide and air containing 40 ppm of ethanol vapor were used as test gases. The results of this test were as shown in the figure. In the drawing, the solid line represents the results obtained for carbon monoxide, the broken line those obtained for ethanol vapor, the one dot-one dash line those for hydrogen, and the two dot-one dash line those for isobutane.

It is noted from the figure that this gas sensor element was capable of detecting flammable gas at temperatures in a wide range of 0° to 500° C. It is also noted that the working temperature of the sensor element could be lowered and the sensitivity thereof notably improved by the immobilization of ultra-fine gold paticles. From the results, it is clear that the method of the present invention is a highly efficient way of preparing a detection material for a flammable gas sensor.

What is claimed is:

1. A method for the production of ultra-fine gold particles immobilized on a metal oxide, characterized by adding dropwise an aqueous gold compound solution kept at a pH value of 7 to 11 to a metal oxide-containing water similarly kept at a pH value of 7 to 11 thereby obtaining an aqueous solution of said metal oxide having gold hydroxide immobilized thereon, separating said metal oxide having gold hydroxide immobilized thereon from said aqueous solution, and heating the separated metal oxide at a temperature in the range of 100° to 800° C.

2. The method according to claim 1, wherein said metal oxide is at least one member selected from the group consisting of $MnO_2$, $Fe_2O_3$, $Co_3O_4$, NiO, CuO, $CuMnO_2$, Co—Mn complex oxide, $Al_2O_3$, $SiO_2$, $TiO_2$, $V_2O_5$, $MoO_3$, and $WO_3$.

3. The method according to claim 1, wherein said gold compound is at least one member selected from the group consisting of chloroauric acid ($HAuCl_4$), sodium chloroaurate ($NaAuCl_4$), gold cyanide (AuCN), potassium cyanoaurate $\{K[Au(CN)_2]\}$, and trichlorodiethylamino auric acid $[(C_2H_5)_2NH.AuCl_3]$.

4. The method according to claim 1, wherein the amount of said metal oxide in said aqueous metal oxide solution is in the range of 10 to 200 g/lit.

5. The method according to claim 1, wherein the amount of said gold compound in said aqueous gold compound solution for dropwise adding is in the range of 0.1 mol/lit to 0.001 mol/lit.

6. The method according to claim 1, wherein the temperature of the water containing said metal oxide carrying thereon gold hydroxide is in the range of 20° to 80° C.

7. A method for the production of ultra-fine gold particles immobilized on a metal oxide surface, characterized by adding a reducing agent adapted to induce precipitation of gold and kept at a pH value of 7 to 11 to an aqueous metal oxide-containing solution having a gold compound dissolved therein and kept at a pH value of 7 to 11 thereby obtaining an aqueous solution of said metal oxide having gold immobilized thereon, and separating said metal oxide having gold immobilized thereon from said aqueous solution.

8. The method according to claim 7, wherein the concentration of said gold compound in said aqueous metal oxide solution having said gold compound dissolved therein is in the range of $1 \times 10^{-2}$ to $1 \times 10^{-5}$ mol/liter.

9. The method according to claim 7, wherein said reducing agent is one member selected from the group consisting of hydrazine, formalin, and sodium citrate.

10. The method according to claim 7, wherein the temperature of said aqueous metal oxide solution having said gold compound dissolved therein is in the range 0° to 80° C.

11. The method according to claim 7, wherein the amount of said reducing agent is in the range of about 1.5 to about 10 times the amount stoichiometrically required for precipitation of gold.

12. A method for the production of ultra-fine gold particles immobilized on a metal oxide, characterized by adding one member selected from the group consisting of carbon dioxide gas and acidic aqueous solutions to an aqueous metal oxide solution having a gold compound dissolved therein and kept at a pH value of not less than 11 thereby adjusting the pH value of said aqueous solution in the range of 7 to 11 and obtaining an aqueous solution of said metal oxide having gold hydroxide deposited on the surface thereof, separating the metal oxide having gold hydroxide deposited thereon from said aqueous solution, and after washing then heating the separated metal oxide having gold hydroxide deposit on the surface thereof at a temperature in the range of 100° to 800° C.

13. The method according to claim 12, wherein said metal oxide is at least one member selected from the group consisting of $MnO_2$, $Fe_2O_3$, $Co_3O_4$, NiO, CuO, $CuMnO_2$, Co—Mn complex oxide, $Al_2O_3$, $SiO_2$, $TiO_2$, $V_2O_5$, $MoO_3$, and $WO_3$.

14. The method according to claim 12, wherein said gold compound is at least one member selected from the group consisting of chloroauric acid ($HAuCl_4$), sodium chloroaurate ($NaAuCl_4$), gold cyanide (AuCN), potassium cyanoaurate $K[Au(CN)_2]$, and trichlorodiethylamine auric acid $[(C_2H_5)_2NH.AuCl_3]$.

15. The method according to claim 12, wherein the temperature of said aqueous metal oxide solution having said gold compound dissolved therein is in the range of 0° to 80° C.

16. The method according to claim 12, wherein said acidic aqueous solution is one member selected from the group consisting of aqueous solutions of nitric acid, hydrochloric acid, sulfuric acid, and acetic acid.

* * * * *